(12) United States Patent
Wuidart et al.

(10) Patent No.: US 7,191,340 B2
(45) Date of Patent: Mar. 13, 2007

(54) GENERATION OF A SECRET QUANTITY BASED ON AN IDENTIFIER OF AN INTEGRATED CIRCUIT

(75) Inventors: Luc Wuidart, Pourrieres (FR); Michel Bardouillet, Rousset (FR); Laurent Plaza, Fuveau (FR)

(73) Assignee: STMicroelectronics S.A., Montrouge (FR)

(*) Notice: Subject to any disclaimer, the term of this patent is extended or adjusted under 35 U.S.C. 154(b) by 795 days.

(21) Appl. No.: 10/269,098

(22) Filed: Oct. 10, 2002

(65) Prior Publication Data

US 2003/0103629 A1    Jun. 5, 2003

(30) Foreign Application Priority Data

Nov. 30, 2001    (FR) .................................. 01 15529

(51) Int. Cl.
*G06F 11/30* (2006.01)
*H04L 9/00* (2006.01)
*G07C 9/00* (2006.01)
*G07B 15/00* (2006.01)
*H04L 9/32* (2006.01)

(52) U.S. Cl. ...................... 713/189; 380/262; 380/263; 380/264; 380/265

(58) Field of Classification Search ................ 713/189, 713/194; 380/265, 262, 263, 264
See application file for complete search history.

(56) References Cited

U.S. PATENT DOCUMENTS 4,529,870 A     7/1985   Chaum (Continued)

FOREIGN PATENT DOCUMENTS

DE          19843424 A1      3/2000

(Continued)

OTHER PUBLICATIONS

French Search Report from priority French patent application No. 0115529, filed Nov. 30, 2000.

(Continued)

*Primary Examiner*—Emmanuel L. Moise
*Assistant Examiner*—Courtney D. Fields
(74) *Attorney, Agent, or Firm*—Lisa K. Jorgenson; William R. McClellan; Wolf, Greenfield & Sacks, P.C.

(57) ABSTRACT

A method and a circuit for generating a secret quantity based on an identifier of an integrated circuit, in which a first digital word is generated from a physical parameter network, and this first word is submitted to at least one retroaction shift register, the output of the shift register forming the secret quantity.

29 Claims, 1 Drawing Sheet

U.S. PATENT DOCUMENTS

| | | | |
|---|---|---|---|
| 4,783,801 A | 11/1988 | Kaule | |
| 4,862,501 A | 8/1989 | Kamitake et al. | |
| 5,036,461 A | 7/1991 | Elliott et al. | |
| 5,227,613 A | 7/1993 | Takagi et al. | |
| 5,363,448 A | 11/1994 | Koopman et al. | |
| 5,436,971 A | 7/1995 | Armbrust et al. | |
| 5,495,419 A | 2/1996 | Rostoker et al. | |
| 5,734,819 A | 3/1998 | Lewis | |
| 5,818,738 A | 10/1998 | Effing | |
| 5,841,866 A | 11/1998 | Bruwer et al. | |
| 5,903,461 A | 5/1999 | Rostoker et al. | |
| 5,999,629 A | 12/1999 | Heer et al. | |
| 6,073,236 A | 6/2000 | Kusakabe et al. | |
| 6,097,814 A | 8/2000 | Mochizuki | |
| 6,161,213 A | 12/2000 | Lofstrom | |
| 6,230,267 B1 | 5/2001 | Richards et al. | |
| 6,230,270 B1 | 5/2001 | Laczko, Sr. | |
| 6,438,718 B1 | 8/2002 | Cline | |
| 6,641,050 B2 | 11/2003 | Kelley et al. | |
| 6,704,872 B1 | 3/2004 | Okada | |
| 6,795,837 B1 | 9/2004 | Wells | |
| 2001/0055132 A1 | 12/2001 | Oshima et al. | |
| 2003/0102493 A1 | 6/2003 | Wuidart et al. | |
| 2003/0103628 A1 | 6/2003 | Luc et al. | |
| 2004/0199736 A1 | 10/2004 | Kamano et al. | |
| 2005/0021990 A1* | 1/2005 | Liardet et al. | 713/194 |
| 2005/0188218 A1 | 8/2005 | Walmsley et al. | |

FOREIGN PATENT DOCUMENTS

| | | |
|---|---|---|
| EP | 998073 A2 | 5/2000 |

OTHER PUBLICATIONS

French Search Report from related French patent application No. 0115526, filed Nov. 30, 2001.

Menezes et al., *Handbook of Applied Cryptography*, Handbook of Applied Cryptography, CRC Press Series on Discrete Mathematics and Its Applications, 1997 pp. 39-41, 203-208, 568 XP002217340.

Schneier, B., *Applied Cryptography*, Applied Cryptography. Protocols Algorithms, and Source Code in C, 1996, pp. 381-384 XP002217341.

Search Report from French Patent Application No. 0115531, filed Nov. 30, 2001.

* cited by examiner

GENERATION OF A SECRET QUANTITY BASED ON AN IDENTIFIER OF AN INTEGRATED CIRCUIT

BACKGROUND OF THE INVENTION

1. Field of the Invention

The present invention relates to the use of a secret quantity coming from an integrated circuit or from an electronic sub-assembly element containing such a circuit. For example, the present invention relates to the use of such a secret quantity by programs such as an encryption key, as a secret quantity of an integrated circuit identification or authentication process. The present invention more specifically relates to the use of an integrated circuit chip digital identifier coming from a physical parameter network linked to the manufacturing of the integrated circuit chip.

2. Discussion of the Related Art

The use of an identifier coming from a physical parameter network, for example, to authenticate an integrated circuit chip or to code a datum that it provides, is more and more appreciated, since this enables using a binary word hidden or embedded in the integrated circuit without permanently storing it in a storage element that could be pirated. The system reliability against possible frauds is thus improved. Further, the use of a physical parameter network enables obtaining digital identifiers distinct from one another for different integrated circuit chips coming from a given manufacturing.

Generally, the digital identifier of the integrated circuit is provided to the outside of the circuit after having possibly been coded or scrambled to be transmitted to a remote system. The latter exploits the word that it receives, generally without having to know the identifier.

An example of application of the present invention relates to the field of smart cards used for financial transactions from count units, prepaid or not, be the transmission with or without contact with the smart card reader.

Another example of application relates to data transmission systems using a personalized decoder on the user side. In such a case, the decoder may include an authentication circuit exploiting an identifier coming from a physical parameter network of an integrated circuit that it contains. By analogy with smart card readers used in payment systems, this amounts to combining a reader with its smart card at the user level, the authentication remaining performed by a system different from the reader.

A disadvantage of the use of an integrated circuit identifier coming from a physical parameter network is linked to its individual and immovable character.

Thus, in the case where a pirate succeeds in pirating the identifier or a digital word (authentication amount or coding key) containing this identifier, there is no other solution than changing the integrated circuit. Indeed, from the moment that the identifier is suspected to have been pirated, it is desirable, in secure applications, to no longer use this identifier. This phenomenon is generally known as the revocation of a coding key or of an authenticator, or more generally of a secret quantity.

The absence of any solution to the revocation of a key or of a secret quantity based on the use of a physical parameter network of an integrated circuit presently limits the use of these identifiers which are, for many other purposes, very advantageous.

SUMMARY OF THE INVENTION

The present invention aims at overcoming the known disadvantages of a digital identifier coming from a physical parameter network in an integrated circuit.

The present invention more specifically aims at enabling revocation of a secret quantity or key based on an identifier coming from a physical parameter network without having to change the involved integrated circuit.

It could be devised to multiply the number of physical parameter networks to multiply the number of possible digital identifiers in case of a revocation. Such a solution, however, has the disadvantage of being bulky in the integrated circuit. Further, the number of possible identifiers remains very limited.

Further, a secret quantity size which is greater than the size of the word coming from the physical parameter network may be searched.

Another object of the present invention is to provide a solution which does not eliminate the individual character of the integrated circuit identifier by means of a physical parameter network.

The present invention also aims at providing a solution which is compatible with the miniaturization of integrated circuits.

The present invention also aims at providing a solution which is transparent on the side of the secret quantity exploitation system, that is, which does not require for the latter to know the means used, to make the secret quantity more secure.

To achieve these and other objects, the present invention provides a method for generating a secret quantity based on an identifier of an integrated circuit, including the steps of:

generating a first digital word from a physical parameter network; and submitting this first word to at least one retroaction shift register, the output of said shift register forming said secret quantity.

According to an embodiment of the present invention, the first word is submitted to several retroaction shift registers, and one of these registers is selected to form the secret quantity.

According to an embodiment of the present invention, the selection is intended to be modified after a revocation of a preceding secret quantity.

According to an embodiment of the present invention, the shift register(s) are with a linear retroaction.

According to an embodiment of the present invention, a shift register is selected from among several ones by means of a selector.

The present invention also provides a circuit for generating a secret quantity internal to an integrated circuit, including:

a generator of a first digital word specific to the integrated circuit chip based on a physical parameter network;

at least one retroaction shift register intended to receive as an input the first word and to provide said quantity; and a selector of the derivation sequence of the shift register, programmable by means of a counter.

The present invention further provides a circuit for generating a secret quantity internal to an integrated circuit, including:

a generator of a first digital word specific to the integrated circuit chip, based on a physical parameter network;

several retroaction shift registers intended to receive as an input the first binary word; and a selector of one of the shift registers to provide said secret quantity.

According to an embodiment of the present invention, the selection performed by the selector is intended to be modified in case of a revocation of the secret datum.

According to an embodiment of the present invention, the selector is formed of a multiplexer for selecting an input or output from among the inputs/outputs of the shift registers.

According to an embodiment of the present invention, registers for storing the first word and the secret quantity are temporary registers, the circuit including means for resetting these temporary storage elements after a predetermined duration.

The foregoing objects, features and advantages of the present invention, will be discussed in detail in the following non-limiting description of specific embodiments in connection with the accompanying drawings.

DETAILED DESCRIPTION

Figure 1:
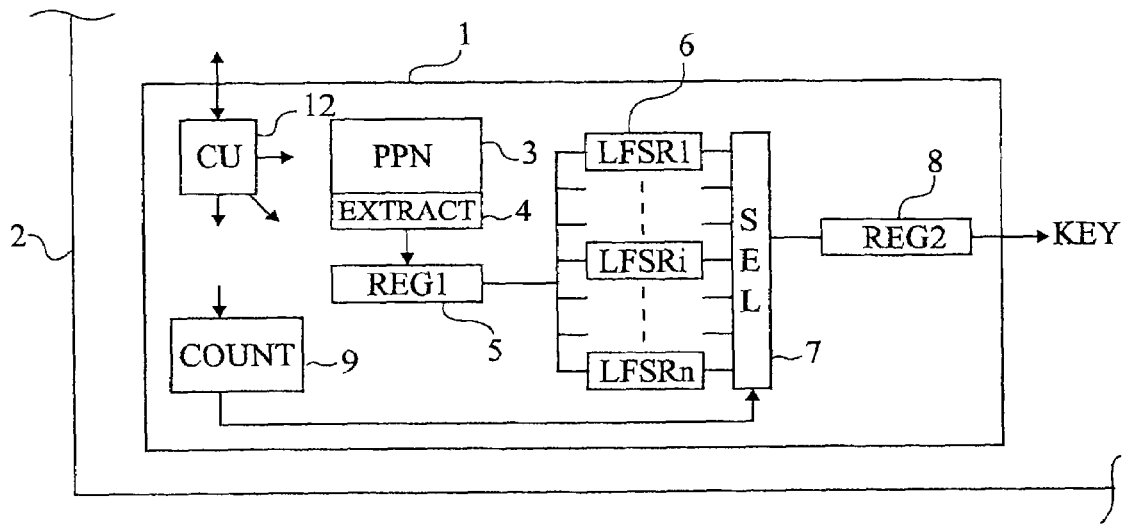
FIG. 1 very schematically shows in the form of blocks an embodiment of a circuit for generating a secret quantity according to the present invention.

For clarity, only those elements of the integrated circuit that are necessary to the understanding of the present invention have been shown in the drawings and will be described hereafter. In particular, the components of the integrated circuit or of the electronic sub-assembly element which do not take part in the generation of the secret quantity by means of the physical parameter network characteristic of the present invention have not been illustrated. Further, the exploitation of the secret quantity (for example, by an authentication or coding process), be it internal or external to the integrated circuit, has not been detailed, since the present invention applies to any conventional process.

A feature of the present invention is to associate with a physical parameter network providing a first digital word linked to the manufacturing of an integrated circuit at least one shift register, preferably with a linear retroaction, and to use the digital word provided by this shift register to form the secret quantity of the integrated circuit.

According to the present invention, several linear retroaction shift registers are functionally used. Either the number of registers may be physically multiplied in the integrated circuit generation, or a single register may be provided, of which the different derivatives of the bits may be provided as will be seen hereafter.

FIG. 1 shows in a very simplified view in the form of blocks an embodiment of a cell 1 for generating a secret quantity (KEY) of an integrated circuit 2.

Cell 1 includes a physical parameter network 3 (PPN) linked to the integrated circuit chip manufacturing. Physical parameter network 3 provides a great number of signals and is associated with an circuit 4 for extracting a binary word representative of the physical parameter network and temporarily stored in a storage element 5 (REG1).

Any physical parameter network, including, for example, of measuring electric parameters may be used. It may for example be a measurement of a threshold voltage of a transistor, a measurement of a resistance or a measurement of a stray capacitance, a measurement of the current generated by a current source, a measurement of a time constant (for example, an integrated circuit), a measurement of an oscillation frequency, etc. Since these characteristics are sensitive to technological and manufacturing process dispersions of the integrated circuit, it is considered that the electric parameters taken into account are specific to the manufacturing and form a signature of the integrated circuit.

In the example of an electric parameter measurement, the signals are converted into digital signals by means of an analog-to-digital converter which includes extraction circuit 4 and may be multiplexed to form the binary word stored in register 5.

As a physical parameter network, circuits using a time measurement may possibly be used. For example, the read/write time of an EEPROM-type memory is measured. An example of a physical parameter network of this type is described in U.S. Pat. No. 5,818,728, which is incorporated herein by reference.

A physical parameter network based on flip-flops such as described in French patent application no. 0104585 of the applicant may further be used, which is incorporated herein by reference.

According to the present invention, key KEY is obtained by submitting the binary word extracted from the physical parameter network to a linear shift register.

In the embodiment illustrated in FIG. 1, n linear shift registers 6 (LSFR1, LSFRi, . . . , LSFRn) are provided. The respective outputs of the different registers are, for example, sent onto a selector 7 (SEL), the output of which provides the secret quantity in a temporary memorization element 8 (REG2). As an alternative, selector 7 may be located upstream of registers 6 rather than downstream.

The selection of the used linear shift register, and thus the control of selector 7, is performed based on a binary parameterizing word generated by a counter 9 (COUNT), which thus conditions the current secret quantity, that is, the quantity used as long as it has not been revoked. The selector may be a multiplexer, or any other adapted conventional means.

The counter is incremented each time the secret datum must be changed after a revocation of the previously-used datum. It should be noted that counter 9 is modulo number n of shift registers.

Preferably, cell 1 belongs to a secure area of integrated circuit 2. "Secure area" means an area protected against attacks by direct electric measurement. For example, it may be a cell embedded in a resin, the melting temperature of which would cause the destruction of the circuit should a pirate attempt to detect its content.

According to another embodiment, not shown, a single linear shift register, the derived bits of which are parameterized, is used. This feature will be better understood hereafter in relation with FIGS. 2 and 3.

Generation cell 1 further includes a central unit 12 (CU) for controlling the different elements forming it. Central unit 12 communicates, among others, with the rest of the integrated circuit, especially to receive the control signals of generation of the secret quantity in a preferentially ephemeral way when it is required, and to receive the control signals necessary to the generation of a new secret quantity after a revocation, that is, a control signal triggering the incrementation (or decrementation) of counter 9.

It should be noted that the system exploiting the secret quantity only processes secret quantity KEY and needs not know the way in which it is generated. Thus, the generation cell according to the present invention is transparent for the exploitation made of the secret quantity and is thus compatible with any conventional exploitation.

As an alternative, counter 9 is replaced with a list of selection codes of the multiplexer forming selector 7. These codes are stored in a non-volatile memory in a parameterizing phase preceding any use.

The use of linear shift registers is a particularly advantageous way, simple to implement, of making a secret quantity revocable or, more specifically, of enabling a change in a secret quantity of an integrated circuit in case of a revocation of a preceding quantity, while taking advantage of an identifier coming from a physical parameter network, and especially of the fact that such an identifier cannot be pirated by electric measurement.

Figure 2:
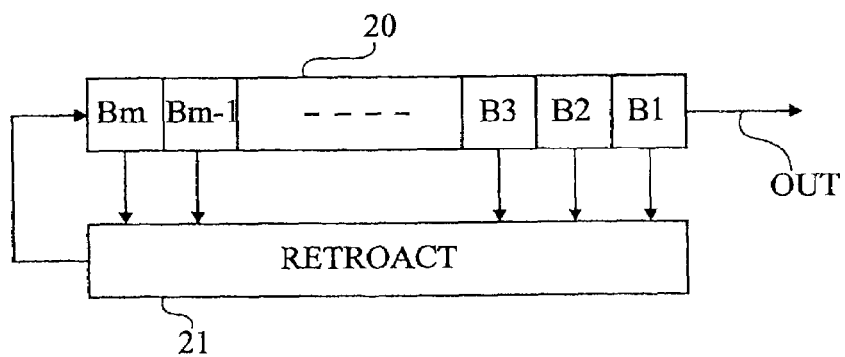
FIG. 2 shows the general block diagram of a linear retroaction shift register used in the circuit of FIG. 1.

FIG. 2 shows the general block diagram of a retroaction shift register Such a register is essentially formed of two parts, a shift register 20 and a retroaction function 21 (RETROACT). Shift register 20 forms a succession of bits B1, B2, B3, . . . , Bm−1, Bm, like any shift register. The function of block 21 forming the retroaction function is to calculate the input bit of the shift register (bit Bm) based on a combination of at least part of the bits contained in the register, upon each shifting of the bit succession. Accordingly, each bit of shift register 20 may be individually provided to retroaction function 21. The output of shift register 20 is, in series form, formed by least significant bit B1 of the binary word of the register. In an embodiment with a parallel output, the values of all the bits of the shift register or of part of these bits according to the size of the searched word are simultaneously sampled.

An advantage of the use of a shift register is that its implementation is particularly simple. As a retroaction function, any conventional function may be used. It may also be envisaged to use a non-linear retroaction function, provided that it enables generating a reproducible word as an output. However, according to a preferred embodiment of the present invention, a linear retroaction function which is a combination of XOR type of some bits of the shift register is used. The list of these bits is generally designated by expression "deriving sequence" or "Fibonacci configuration".

The repetition period of a binary word contained in the shift register not only depends on the number of bits of this register, but also on the retroaction function used. In a linear shift register of in bits, $2^m-1$ distinct binary sequences are available. In other words, by loading the successive bits provided on output OUT in a register of adapted size, secret quantities having sizes ranging to $2^m-1$ bits may be obtained. This forms the longest word before repetition. The fact of using a series unloading of the code provided by the linear shift register enables lengthening the secret quantity with respect to the length of the word provided by the physical parameter network.

Figure 3:
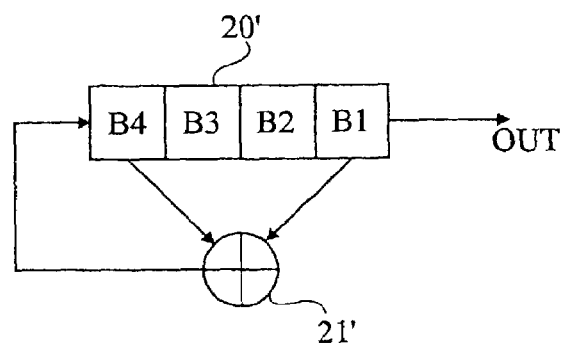
FIG. 3 shows a simplified example of a linear retroaction shift register of four bits, derived at the first and at the fourth bit.

FIG. 3 shows, to better understand the operation thereof, a simplified linear shift register of four bits in which the deriving sequence is B1, B4. In other words, bits B1 and B4, respectively the least significant bit and the most significant bit of the word contained in register 20' over four bits are combined by a gate of XOR type 21' forming the retroaction function. The output of gate 21' forms the shift register input, and thus the input of value B4. Output sequence OUT is provided by the least significant bit (B1).

The successive contents of register 20' will be, assuming an initialization with value 1000, that is, a loading of a state 1 in bit B4 after resetting all other bits to 0:

1000; 1100; 1110; 1111; 0111; 1011; 0101; 1010; 1101; 0110; 0011; 1001; 0100; 0010; 0001, before repeating.

The choice of the derivation frequency according to the number of possible combinations before repeating is within the abilities of those skilled in the art according to the application. The realization of a linear shift register, be it in hardware or software form, is perfectly conventional. Reference may be made, for example, to work "Applied cryptography" by Bruce Schneier, published by Wiley, second edition, pages 395 to 401, which is incorporated herein by reference.

The word coming from network 3 and used to set the initial sequence of registers 6 may be loaded in series or in parallel therein. By setting the initial content of a register 6, the number of shift registers which is controlled by unit 12 and which is preferably predetermined conditions, in a reproducible manner, the obtained final word.

It can be seen that by changing the derivation sequence (which amounts to the same as selecting another register 6 of the series of n of FIG. 1), the word obtained for a same input word (with a same number of shift cycles greater than m) is modified. As an alternative, the number of shift cycles may be changed to change the secret quantity.

An advantage of the present invention is that it enables solving the problems of revocation of the secret quantities obtained from the binary words coming from physical parameter networks without giving the elements of this anti-revocation procedure to the data exploitation system. Accordingly, the solution provided by the present invention is particularly reliable and secure.

An advantage of the present invention is that it enables using a single physical parameter network while authorizing revocation of certain keys.

Another advantage of the present invention is that it maintains the volatile (ephemeral) character of the secret quantities based on the extraction of a word coming from a physical parameter network.

Of course, the present invention is likely to have various alterations, modifications, and improvement which will readily occur to those skilled in the art. In particular, the lengths of the binary words used depend on the application and essentially on the authentication processes for which the integrated circuit is intended. On this regard, it should be noted that the present invention is compatible with existing procedures of exploitation of a secret quantity provided by an integrated circuit.

Further, the practical realization of a retroaction shift register, be it linear or not, is within the abilities of those skilled in the art based on the functional indications given hereabove. The choice between the use of several shift registers and the use of a single register, the derivation sequence of which is selected by means of switches, may be performed for example according to what is desired to be privileged, between the storage elements and the shift registers.

Further, the choice of the number of shift cycles is not critical, provided that it remains the same for a given key. Upon a key change due to a revocation, another number of cycles may possibly be set, be it to continue the same derivation sequence or not.

Finally, although the present invention has been described hereabove in more specific relation with a hardware implementation, it may be implemented by software means.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for generating a secret quantity based on an identifier of an integrated circuit, including the steps of:
generating a first digital word from a physical parameter network; and
submitting this first word to at least one retroaction shift register, the output of said shift register forming said secret quantity.

2. The method of claim 1, comprising submitting the first word to several retroaction shift registers, and of selecting one of these registers to form the secret quantity.

3. The method of claim 2, wherein the selection is intended to be modified after a revocation of a preceding secret quantity.

4. The method of claim 1, wherein the shift register(s) are with a linear retroaction.

5. The method of claim 1, comprising selecting a shift register from among several ones by means of a selector.

6. A circuit for generating a secret quantity internal to an integrated circuit, including:
a generator of a first digital word specific to the integrated circuit chip based on a physical parameter network;
at least one retroaction shift register intended to receive as an input the first word and to provide said quantity; and
a selector of the drift sequence of the shift register, programmable by means of a counter.

7. A circuit for generating a secret quantity internal to an integrated circuit, including:
a generator of a first digital word specific to the integrated circuit chip based on a physical parameter network;
several retroaction shift registers intended to receive as an input the first binary word; and
a selector of one of the shift registers to provide said secret quantity.

8. The circuit of claim 6, wherein the selection performed by the selector is intended to be modified in case of a revocation of the secret datum.

9. The circuit of claim 7, wherein the selector is formed of a multiplexer of selection of an input or output from among the inputs/outputs of the shift registers.

10. The circuit of claim 6, wherein registers for storing the first word and the secret quantity are temporary storage elements, and wherein the circuit includes means for resetting these temporary storage elements after a predetermined duration.

11. The circuit of claim 10, wherein the storage elements are registers.

12. A circuit for generating a secret quantity in an integrated circuit, comprising:
a generator of a digital word based on a physical parameter network; and
at least one feedback shift register configured to receive the digital word and to provide the secret quantity.

13. A circuit as defined in claim 12, further comprising a selector configured to select a deriving sequence of the shift register.

14. A circuit as defined in claim 13, further comprising a counter configured to program the selector.

15. A circuit as defined in claim 12, wherein the at least one feedback shift register comprises a linear feedback shift register.

16. A circuit as defined in claim 12, wherein the at least one feedback shift register comprises a plurality of feedback shift registers, the circuit further comprising a selector configured to select one of the plurality of feedback shift registers to provide the secret quantity.

17. A circuit as defined in claim 16, wherein the selector comprises a multiplexer configured to select an input or an output from inputs and outputs of the plurality of shift registers.

18. A circuit as defined in claim 13, wherein the selection of the deriving sequence is modified after revocation of a preceding secret quantity.

19. A circuit as defined in claim 16, wherein the selected shift register is modified after revocation of a preceding secret quantity.

20. A circuit as defined in claim 12, further comprising a first register configured to store the digital word and a second register configured to store the secret quantity, the circuit further including means for resetting the first and second registers after a predetermined duration.

21. A circuit for generating a secret quantity in an integrated circuit, comprising:
a generator of a digital word based on a physical parameter network;
a plurality of feedback shift registers configured to receive the digital word; and
a selector configured to select one of the shift registers to provide the secret quantity.

22. A circuit as defined in claim 21, wherein the feedback shift registers comprise linear feedback shift registers.

23. A circuit as defined in claim 21, wherein the selected shift register is modified after revocation of a preceding secret quantity.

24. A circuit as defined in claim 21, wherein the selector comprises a multiplexer configured to select an input or an output of one of the shift registers.

25. A method for generating a secret quantity in an integrated circuit, comprising:
generating a digital word based on a physical parameter network; and
loading the digital word into at least one feedback shift register, an output of the at least one shift register constituting the secret quantity.

26. A method as defined in claim 25, further comprising selecting a deriving sequence of the at least one shift register.

27. A method as defined in claim 25, wherein loading the digital word comprises loading the digital word into a plurality of feedback shift registers and selecting one of the plurality of feedback shift registers to form the secret quantity.

28. A method as defined in claim 27, wherein selecting one of the plurality of feedback shift registers comprises modifying the selection after revocation of a preceding secret quantity.

29. A method as defined in claim 26, wherein selecting a deriving sequence comprises modifying the selection after revocation of a preceding secret quantity.

* * * * *